United States Patent [19]
Millington

[11] Patent Number: 5,884,883
[45] Date of Patent: Mar. 23, 1999

[54] BOWL LIFTING APPARATUS

[75] Inventor: Howard George Millington, Urbana, Ohio

[73] Assignee: David S. Ackerman, South Vienna, Ohio

[21] Appl. No.: 64,946

[22] Filed: Apr. 23, 1998

[51] Int. Cl.⁶ ............................ A47G 29/02; B65D 25/10
[52] U.S. Cl. ...................... 248/309.1; 220/759; 220/769
[58] Field of Search ................... 248/300, 309.1, 248/310, 311.2, 315; 220/574, 759, 769, 737, 735

[56] References Cited

U.S. PATENT DOCUMENTS

| | | | |
|---|---|---|---|
| D. 221,795 | 9/1971 | Jenks | D44/29 |
| 1,285,095 | 11/1918 | Fisher | 220/769 |
| 1,505,258 | 8/1924 | Hagen | 220/759 |
| 5,072,909 | 12/1991 | Huang | 248/311.2 |
| 5,085,391 | 2/1992 | Berger et al. | 248/311.2 |

FOREIGN PATENT DOCUMENTS

| | | | |
|---|---|---|---|
| 637883 | 3/1962 | Canada | 220/759 |

*Primary Examiner*—J. Lanford
*Assistant Examiner*—Michael D. Nornberg
*Attorney, Agent, or Firm*—Mark A. Navarre

[57] ABSTRACT

An improved hand-held bowl lifter for safely lifting and transporting hot bowls from one area to another. The bowl lifter is used with bowls having a circular base, and a wall that tapers outward from the base in substantially circular cross-section. The bowl lifter is defined by a generally planar rigid board having a first end adapted to be grasped by a user, and a second end having a semi-circular opening that intersects an edge of the second end to define a pair of arms. The ends of the arms are separated by a dimension less than the diameter of the opening but greater than the diameter of the bowl base. A user grasps the first end of the board and moves it toward the bowl, allowing the arms to surround the base of the bowl adjacent the underlying support surface. Then the user raises the board so that the inner periphery of the arms evenly contact the outer periphery of the bowl. At this point the bowl is supported in an level and stable manner, and may be safely transported. When the user has positioned the bowl as desired, the bowl lifter is lowered until the base of the bowl contacts the support surface, whereafter the bowl lifer is lower to the support surface and removed without disturbing the bowl or its contents.

6 Claims, 1 Drawing Sheet

BOWL LIFTING APPARATUS

FIELD OF THE INVENTION

This invention relates to a kitchen accessory, and more particularly to a hand-held apparatus for safely lifting and transporting hot bowls.

BACKGROUND OF THE INVENTION

Traditionally, foods of a liquid nature such as soups have been prepared in pots or pans in a cooking area, and then transported to a serving area for distribution into bowls for individual consumption. However, with the introduction and widespread usage of microwave ovens, people commonly heat individual servings of soup and the like in an ordinary soup bowl, and then transport the bowl by hand to a table or serving area for consumption. A problem that arises is that ordinary bowls, unlike pots or pans, are not equipped with a handle, and the consumer is liable to burn his or her fingers in the process of transporting the hot bowl from the microwave oven to the serving area. While pot holders and the like have been used to protect consumers from burns, one-handed operation is difficult if not impossible (especially for the elderly), and these devices tend to slip, possibly leading to spillage of the contents, and scalding of the consumer.

SUMMARY OF THE INVENTION

The present invention is directed to an improved hand-held apparatus, referred to herein as a bowl lifter, for safely lifting and transporting hot bowls from one area to another. The bowl lifter supports the bowl in a stable manner, is easy to use, possibly even one-handed, and is inexpensive to manufacture.

In general, the bowl lifter of this invention can be advantageously used with bowls having a circular base, and a wall that tapers outward from the base in substantially circular cross-section. The bowl lifter is defined by a generally planar rigid board having a first end adapted to be grasped by a user, and a second end having a semicircular opening that intersects an edge of the second end to define a pair of curved arms. The ends of the arms are separated by a dimension less than the diameter of the opening but greater than the diameter of the bowl base, thereby enabling the arms to slide under the bowl, while securely capturing the bowl during lifting.

To use the bowl-lifter, the user simply grasps the first end of the board and moves it toward the bowl, allowing the arms to surround the base of the bowl adjacent the underlying support surface Then the user raises the board so that the curved inner periphery of the arms evenly contact the outer periphery of the bowl. At this point the bowl is supported in a level and stable manner, and may be safely transported to a serving area of the kitchen. When the user has positioned the bowl as desired, the bowl lifter is lowered until the base of the bowl contacts the support surface, whereafter the bowl lifer is lowered to the support surface and removed without disturbing the bowl or its contents.

BRIEF DESCRIPTION OF THE DRAWINGS

The above and other advantages of the invention will become more apparent from the following description taken in conjunction with the accompanying drawings wherein like references refer like parts and wherein.

DETAIL DESCRIPTION OF THE INVENTION

Figure 1:
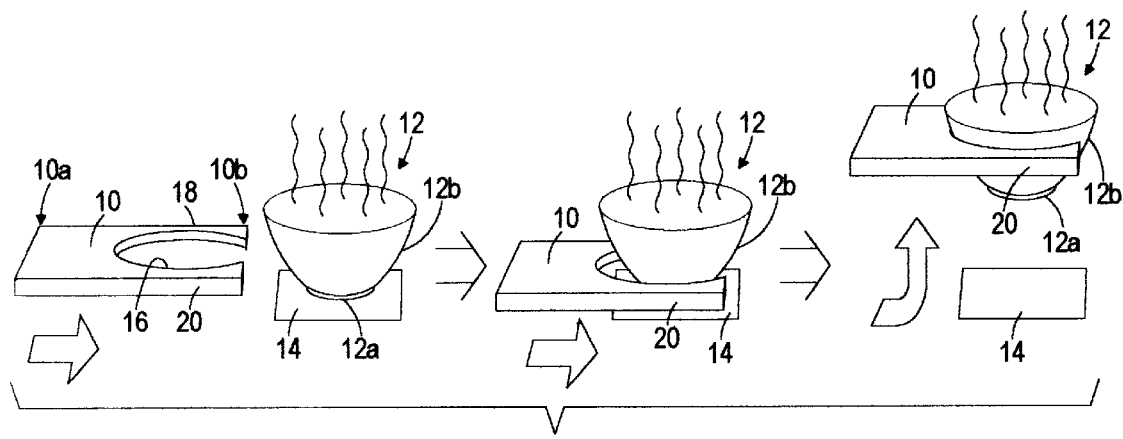
FIG. 1 sequence diagram illustrating usage of the bowl lifter of this invention.

FIG. 1 depicts from left to right a sequence of events in which a bowl lifter 10 according to this invention is used to lift a hot bowl 12 from a flat support surface 14 for transport to a serving area. The support surface may be the floor of a microwave oven heating compartment, or any flat counter or table customarily found in a kitchen. For purposes of illustration, it is assumed that the bowl 12 contains soup or some other liquid that has been heated in a microwave oven, and that the heat of the contents has also heated the exterior surface of the bowl to a temperature that is too hot to be safely handled without a pot holder or some form of protective clothing such as an oven mitt. Although it is certainly possible to lift and transport the bowl 12 using pot holders or oven mitts, such devices have a tendency to slip on the smooth outer periphery of the bowl 12, possibly with disastrous consequences. In general, the bowl 12 is assumed to be of a standard or conventional shape with a circular base 12a and a wall 12b that tapers outward from the base 12a in a substantially circular cross-section. The bowl lifter 10, shown only generally in FIG. 1, is generally planar, having a first end 10a that is solid and adapted to be grasped by a user's hands (not shown), and a second end 10b having a semicircular opening 16 that opens the edge of end 10b, effectively bifurcating the second end 10b into a pair of curved arms 18 and 20.

Viewing the illustration of FIG. 1 from left to right, the bowl holder 10 is grasped by the user, and moved toward the bowl 12 (in the direction of the arrow) in proximity to the surface 14. If desired, the user may tip the end 10b downward so that the ends of curved arms 18, 20 slide along the surface 14 as the bowl holder 10 is moved in proximity to the bowl 12. As the user continues to move the bowl holder 10 in the direction of the arrow, the arms 18, 20 move alongside opposite sides of the bowl 12, with the holder 10 coming to a rest when the inboard edge of circular opening 16 contacts the outer periphery of bowl 12. The user then lifts the bowl holder 10 upward, allowing the holder 10 to move relative to the bowl 12 until the inner periphery of curved arms 18, 20 evenly contact the outer periphery of bowl 12, as seen in the right-most segment of the illustration. At such point, the bowl 12 is securely captured in the opening 16, allowing the user to safely lift the bowl 12 from surface 14, and conveniently transport it to a serving area.

It will be appreciated from the above description that the bowl holder 10 is easy to use, and protects the user from burns due to touching the bowl 12 or splashing the hot contents. Due to the taper of the bowl 12 and the circular symmetry of the bowl 12 and opening 16, the bowl 12 naturally settles into a level position, and remains stationary with respect to the holder 10 while being transported. Moreover, the likelihood of spilling is reduced because only an upward lifting force is required to move the bowl 12; the holder arms 18, 20 evenly grip the bowl so that no squeezing force is required.

Figure 2:
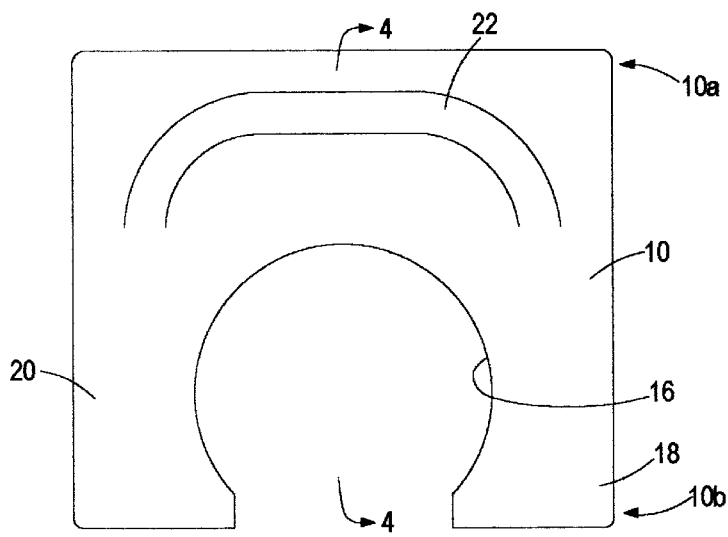
FIG. 2 is a top view of a bowl lifter according to this invention.
Figure 3:
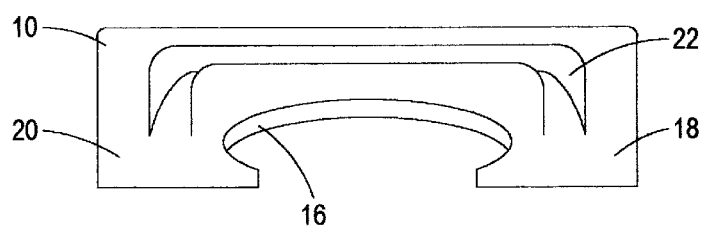
FIG. 3 is a front view of the bowl lifter of FIG. 2.
Figure 4:
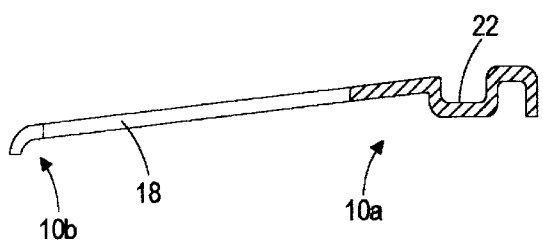
FIG. 4 is a cross-section of the bowl lifter of FIG. 2, taken along lines 4—4.

FIGS. 2–4 depict the holder 10 in further detail, particularly regarding its surface contour. For ease of grasping by a user, the top surface of holder end 10a has a recess 22 which may be curved somewhat, as best seen in FIG. 2 and 4. In operation, the user's thumbs are conveniently inserted at least partially into the recess 22, ensuring a secure grip, and preventing the holder 10 from slipping in the user's hands. In addition to ensuring a secure grip, the recess 22 provides additional rigidity to the holder 10. Additionally, the ends of arms 18 and 20 may be curved downward as best seen in FIG. 4 to provide a smooth surface that lies flat against a support surface 14 when the holder 10 is held at a slight angle with respect to surface 14; this facilitates sliding of the holder 10 along the surface 14 when positioning the holder arms 18, 20 around the base of a bowl 12.

In general, it is intended that the user will use both hands to support the holder 10 when lifting and transporting a bowl 12. However, the holder 10 may safely be used onehanded, depending on the weight of bowl 12 and its contents, allowing increased freedom of motion to the user.

The bowl holder 10 is preferably formed of a rigid heat resistant plastic material amenable to vacuum forming. In routine experimentation, good results have been achieved with plastic material having a thickness of approximately ⅛ (0.125) inch. Additionally, it is generally desirable that the plastic material be transparent so that the user can more easily position the holder 10 with respect to the bowl 12, and to enable the user to more clearly see other objects when transporting and lowering the bowl 12.

As indicated above, the holder of this invention works as intended with a wide variety of kitchen bowls, as the holder 10 is simply lifted until the arms 18, 20 contact the outer periphery of the bowl 12. However, it is expected that for maximum applicability, it may be desired to provide holders in several different sizes to accommodate a wider range of bowl sizes.

While my invention has been described in reference to the illustrated embodiment, it is not intended to be limited thereto. For example, the outer periphery of arms 18, 20 may be curved, and various ribs or conformations may be added to enhance rigidity. It is expected that these and other modifications will occur to those skilled in the art, and it should be understood that holders incorporating such modifications may fall within the scope of this invention, which is defined by the appended claims.

The embodiments of the invention in which an exclusive property or privilege is claimed are defined as follows:

1. In combination:

a heated bowl having a circular base, and a wall that tapers outward from said base in substantially circular cross-section; and a lifting device hand-held by a user to permit such user to lift and transport the bowl without directly touching the bowl, the lifting device comprising a generally planar rigid board having a first end defined by a surface adapted to be grasped by the user, and a second end having a semi-circular opening that intersects an edge of said second end to define a pair of arms having a semi-circular inner periphery, said arms being separated at ends thereof by a dimension less than a diameter of said opening but greater than a diameter of the bowl base, enabling the user to position the device so that said arms move along opposite sides of the base of the bowl and securely support the bowl as the board is lifted away from a surface supporting the bowl.

2. The combination of claim 1, where the lifting device includes a recess formed in the first end of said board and extending substantially parallel to an edge of said first end to facilitate grasping of said first end by said user.

3. The combination of claim 2, where the ends of the arms of the lifting device are curved downward to form a surface for sliding along said support surface as said device is positioned relative to said heated bowl.

4. The combination of claim 1, where the board of said lifting device is generally rectangular in shape.

5. The combination of claim 1, where the board of said lifting device is formed of a plastic material.

6. The combination of claim 1, where the board of said lifting device is formed of a transparent material, affording the user an uninterrupted view when positioning the board and supporting the bowl.

* * * * *